W. J. ENGLISH.
Assignor to M. R. CAPRON.
Screen for Carding-Machines.
No. 8,313. Reissued July 2, 1878.
Fig. I.
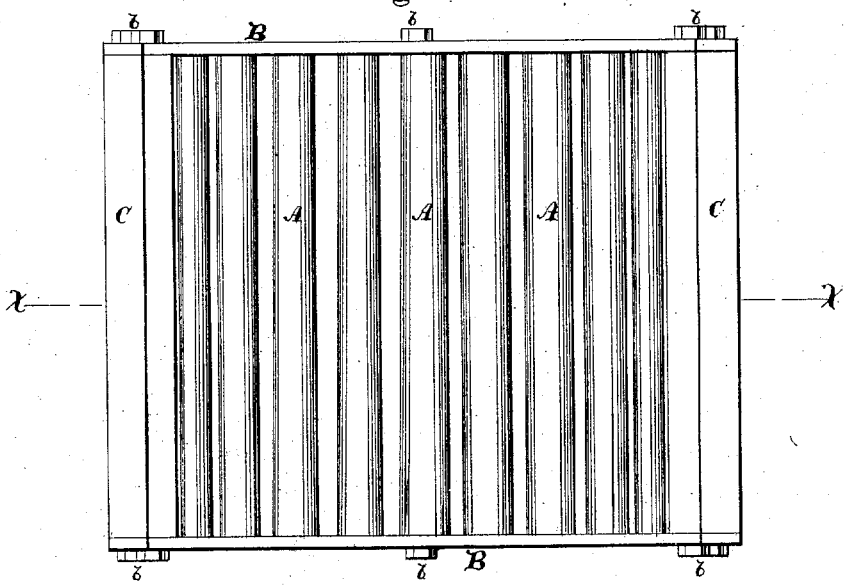
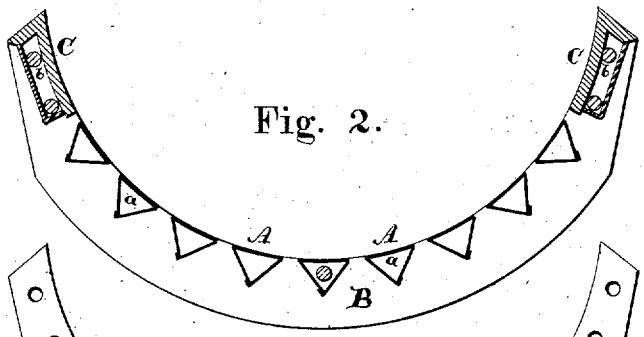
Fig. 2.
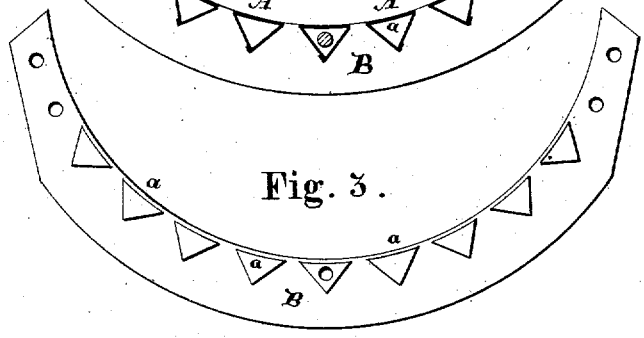
Fig. 3.
WITNESSES:
Joseph A. Miller Jr.
William L. Cropp.
INVENTOR:
William J. English
by Joseph A. Miller
attorney
N. PETERS, PHOTO-LITHOGRAPHER, WASHINGTON, D. C.

UNITED STATES PATENT OFFICE.

WILLIAM J. ENGLISH, OF PROVIDENCE, RHODE ISLAND, ASSIGNOR TO MATUREN R. CAPRON, OF SAME PLACE.

IMPROVEMENT IN SCREENS FOR CARDING-MACHINES.

Specification forming part of Letters Patent No. 153,429, dated July 28, 1874; Reissue No. 8,313, dated July 2, 1878; application filed March 19, 1878.

*To all whom it may concern:*

Be it known that I, WILLIAM J. ENGLISH, of the city and county of Providence, and State of Rhode Island, have invented certain new and useful Improvements in Card-Screens for Carding-Engines; and I do hereby declare that the following is a full, clear, and exact description of the same, reference being had to the accompanying drawings, forming part of this specification.

Figure 1 is a top view of my improved card-screen. Fig. 2 is a sectional view on the line *x x*. Fig. 3 shows the inner side of one of the ribs detached and the hubs cast thereon.

My invention is designed for use on woolen and cotton carding engines. Its purpose is to form a screen that shall be stiff and rigid, not liable to yield to the air-blast of the rapidly-revolving main cylinder, and, by presenting smooth bent corners, will prevent the adhesion of fibers, and thus prevent waste in carding, and allow the dirt, foreign matter, and useless short fiber to pass through the screen without adhering to the bars, as is the case with screens as heretofore constructed.

It is common now to place a sheet of metal beneath the main cylinder of the carding-engine wherein perforations have been cut; but the cotton or wool fiber is apt to catch upon the rough edges of these openings, and long fiber is liable to be pulled from the cylinder, while the short waste and dirt are liable to clog the same, and so prevent their passage through the screen.

The invention consists in making the bars of bent sheets of tin-plate or similar sheet metal, angular or semicircular in shape, and stationarily securing the same to the side ribs, as will be more fully set forth hereinafter.

In the drawings, A A are hollow sheet-metal bars, bent into angular or semicircular shape in their cross-section, and stationarily secured to the ribs B. The edges of such bars are perfectly smooth and slightly rounded, so that the fibers will not adhere to the same. They are light, and, by virtue of their peculiar construction, stiff and strong. They have a slightly-curved surface above, the edges of the metal being united below by either soldering or folding one over the other, as shown in Fig. 2. They are, when made in this way, as stiff as if solid, able to resist pressure from any direction, and rigidly maintain the desired position with reference to the main cylinder.

The bars of screens made after my invention cannot warp or vibrate, as do bars made of wood; neither will they bend or sag, as bars of solid metal are liable to do. As the upper surface is extended and the lower contracted, they give a free passage to dirt and air; and, as they are lapped one sheet over the other at their lower surfaces, great strength and stiffness are secured.

As the bars are made of bent sheet metal, they present smooth edges on the upper surface, and the fiber is not caught or entangled by them, but passes over or between them without lashing or clogging. These hollow bent sheet-metal bars fit upon and are supported by hubs *a a*, provided on the inner surface of the ribs B, which ribs are bolted together. *b b* are the rods by which they are firmly secured together. The inner or upper edges of the ribs are formed in the arc of a circle corresponding with the carding-cylinder.

The series of bars A terminates at both ends with a broad metallic tip, C, through which the rods *b b* pass, as shown.

When secured to a carding-cylinder, these screens, by their rigidity, will retain their proper position under all circumstances without endangering the wires on the cylinder, or, by sagging, allow loose fiber to accumulate.

The difficulty heretofore experienced in the use of aprons or sheets of perforated metal suspended beneath the cylinder is that they sag or bend by their own weight, so as not to be at the desired distance from the carding-cylinder at all points. The lower parts, being too far from the cylinder to be reached by the same, will allow fiber to accumulate, thus causing waste of wool or cotton and imperfect work, while all the dirt and loose fiber are liable to be raised by the indraft of air at the first starting of the carding-engine, and, when in operation, preventing the free discharge of dirt, foreign, matter and waste.

I am aware that parallel bars have, before my invention, been used in card-screens; and I do not claim such as my invention, broadly.

Having thus described my invention, I claim as new and desire to secure by Letters Patent—

1. A card-screen composed of hollow metallic triangular bars A, ribs B, having projections *a a* on their inside surfaces for the support of the ends of hollow bars A, and hollow metallic ends C C, these parts secured by through-rods *b b*, all substantially as and for the purpose described.

2. In a card-screen, the combination of the side ribs B, provided on their inside surfaces with projections *a a*, with the hollow sheet-metal bars A, secured to the ribs by the projections *a a* and through-bolts *b b*, substantially as and for the purpose described.

3. The bars forming part of the card-screen, made of hollow sheet metal, having their surfaces near the cylinder curved, and the edges of the sheets secured together at their lower sides, all constructed substantially as and for the purpose described.

In testimony that I claim the above as my invention I have hereunto affixed my signature in presence of two witnesses.

WILLIAM J. ENGLISH.

Witnesses:

SAMUEL VANSTONE,
JOSEPH A. MILLER, Jr.